United States Patent [19]

Kettner

[11] Patent Number: 5,749,658
[45] Date of Patent: May 12, 1998

[54] CLOSURE ARRANGEMENT FOR ATTACHMENT TO OUTSIDE OF BAG

[75] Inventor: Catherine E. Kettner, Appleton, Wis.

[73] Assignee: Reynolds Consumer Products, Inc., Appleton, Wis.

[21] Appl. No.: 712,917

[22] Filed: Sep. 12, 1996

[51] Int. Cl.[6] .................................................. B65D 33/24
[52] U.S. Cl. ........................ 383/204; 24/587; 383/61; 383/65; 383/210
[58] Field of Search ............................. 383/63, 64, 65, 383/61, 210, 211, 204, 209; 24/587, 399, 400

[56] References Cited

U.S. PATENT DOCUMENTS

| | | |
|---|---|---|
| 3,181,583 | 5/1965 | Lingenfelter ............... 383/63 |
| 3,791,337 | 2/1974 | Schamblin ................. 383/63 |
| 4,363,345 | 12/1982 | Scheibner ................. 383/63 |
| 4,691,373 | 9/1987 | Ausnit ..................... 383/63 |
| 4,703,518 | 10/1987 | Ausnit ..................... 383/63 |
| 4,731,911 | 3/1988 | Gould ...................... 24/587 |
| 4,787,754 | 11/1988 | Herrington ................ 383/63 |
| 4,787,755 | 11/1988 | Branson .................... 383/65 |
| 4,892,512 | 1/1990 | Branson .................... 493/194 |
| 4,971,454 | 11/1990 | Branson et al. ............ 383/61 |
| 5,033,868 | 7/1991 | Peppiatt ................... 383/63 |
| 5,185,909 | 2/1993 | Inagaki .................... 24/587 |
| 5,198,055 | 3/1993 | Wirth et al. .............. 383/63 |
| 5,209,574 | 5/1993 | Tilman ..................... 383/65 |
| 5,242,516 | 9/1993 | Custer et al. ............. 383/63 |
| 5,335,997 | 8/1994 | Kanemitsu et al. .......... 383/61 |
| 5,369,847 | 12/1994 | Naya et al. ............... 24/30.5 R |
| 5,474,382 | 12/1995 | May ........................ 383/63 |
| 5,489,252 | 2/1996 | May ........................ 383/210 |
| 5,525,363 | 6/1996 | Herber et al. ............. 383/61 |

Primary Examiner—Stephen P. Garbe
Attorney, Agent, or Firm—Alan T. McDonald

[57] ABSTRACT

A zipper for a recloseable bag provides a heat-settable portion for adhering the zipper to a polymeric bag at a temperature below that known in the art in order to prevent permanently sealing the bag closed inadvertantly. The zipper includes elongated base strips having flange portions for adhering the inner surface of the base strip to the outer surface of a polymeric bag. The base strip is adhered to the polymeric bag by a heat-setting compound coextruded, coated or laminated to the inner surface of the flange. The flange portions may be thinner than other portions of the base strips to permit the flange portions to be fused to the polymeric bag at a lower temperature than previously practiced.

28 Claims, 4 Drawing Sheets

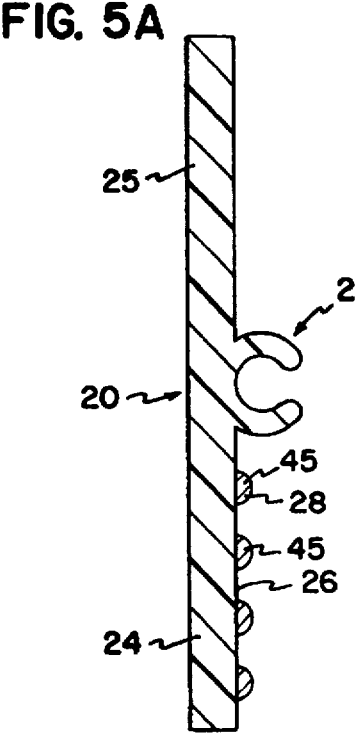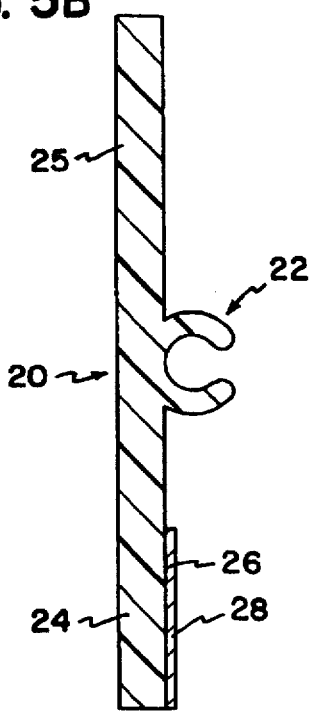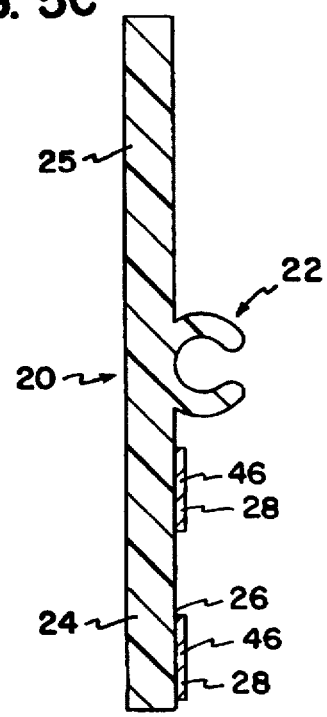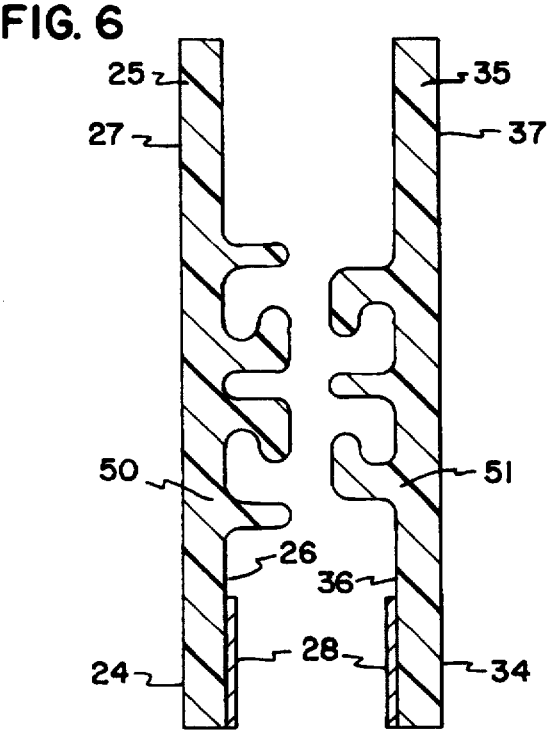

CLOSURE ARRANGEMENT FOR ATTACHMENT TO OUTSIDE OF BAG

FIELD OF THE INVENTION

The present invention relates to a closure arrangement for a recloseable bag. More particularly, the invention relates to a zipper having male and female profiles.

BACKGROUND OF THE INVENTION

Many consumer packaging applications employ recloseable bags using recloseable zippers for locking products within the bags. A typical recloseable zipper includes male and female profiles extending along the entire length of the zipper. The male profile is often tree shaped, with an expanded head portion supported by a narrower trunk portion. The female profile is disposed opposite to the male profile and is adapted to mate with the male profile by a pair of legs having locking edges and cornered shoulders. The profiles are interlocked by properly aligning the male and female profiles and pressing them together along the entire length of the zipper. The opposing legs of the female profile slide over the expanded head portion of the male profile, and lock to it by locking the head with the cornered shoulders and resting in the trunk portion.

The recloseable zipper is typically formed of a polymeric material by an extrusion process. The recloseable zipper is normally permanently attached to a polymeric bag or film by a thermal-fusion process in which a heated metal bar is pressed against the polymeric bag or film while in contact with the zipper. The zipper is typically attached to a polymeric film used to form the recloseable bag. The attachment is made prior to sealing and cutting of the film's side walls to form the finished bag.

Conventional zippers can be problematic if the bag is pre-formed prior to attachment of the zipper. In the case of bags pre-formed prior to attaching the zipper, it is difficult to place a zipper on the interior of the bag. Also, with a typical pre-formed bag, the side walls are already cut and sealed, and thus the zipper cannot readily be fused onto the side walls.

In connection with the present invention, attaching the zipper on the outside of the bag was considered a possible solution. However, this can pose substantial problems because the heat required to fuse the zipper to the polymeric film is often so high that not only does the polymeric film become fused to the zipper, but the two film layers may become fused to one another to create a permanent bond between the layers. This bond eliminates the ability to open the bag without destroying its recloseable features. This problem is not as evident when the zipper is installed on the inside of a bag, because the zipper is typically thicker than the walls of the bag, and therefore the heat necessary to fuse the bag to the zipper must be sufficient only to pass through the bag wall, not through an entire zipper. Similarly, since most bag walls are constructed of a relatively thin layer, they readily fuse when in contact with each other.

Consequently, a need exists for a zipper for a recloseable bag which overcomes the aforementioned shortcomings associated with existing zippers.

SUMMARY OF THE INVENTION

The present invention is directed to a zipper for a recloseable bag. The zipper comprises first and second generally parallel extruded base strips. These base strips are substantially co-planar and laterally spaced from one another. Each

2 of the base strips has an inner surface, an outer surface, and a flange portion. The flange portions are configured for permanent attachment to an exterior surface of the film forming the polymeric bag by means of a heat-setting sealant compound.

The inner surface of the base strips includes closure profiles positioned above the flange portions and configured to interlock with one another. The closure profiles are positioned to interlock above the bag films. A heat-setting sealant compound is coextruded, coated, or laminated to the inner surface of the flange portions for permanently adhering the inner surfaces of the flange portions to an exterior surface of the polymeric bag. The zippers are adhered to the flange portions at a point below the closure profiles.

In one embodiment, the flange portions of the base strips are thinner than the portion of the base strips located above the closure profiles. For example, the flange portions may be from 2 to 3 mils thick, and the portion of the base strips above the closure profiles may be from 5 to 6 mils thick.

The heat-setting sealant compound may be any one of numerous heat sensitive compounds used for adhering polymeric materials together. These compounds may be, for example, anhydride modified polyolefins, metallocene catalyzed linear low density polyethylene, maleic anhydride, anhydride modified ethylene vinyl acetate, polypropylene copolymers, polypropylene copolymers blended with ethylene vinyl acetate, polypropylene copolymers and polyolefin blends, polypropylene terpolymers, polypropylene terpolymers and polyolefin blends, polypropylene terpolymers and ethylene vinyl acetate blends, polypropylene based thermoplastic polyolefins, butene polypropylene copolymers, ethylene vinyl acetate (EVA), acid modified EVA, ethylene methyl acrylate (EMA), ethylene methylmethacrylate (EMMA), ethylene acrylic acid (EAA), ethylene ethyl acrylate (EEA), ethylene methacrylic acid (EMAA) and polypropylene-based flexible polyolefins.

In certain implementations, the heat-setting compound may be distributed in a uniform-width band along the inner surface of each of the flanges. In other implementations, the heat-setting compound may be distributed in at least two distinct bands along the inner surface of each of the flanges. Alternatively, the adhesive compound may be distributed on each of the flanges so as to leave a gap between the heat-setting compound and the profile.

In an implementation of the invention, each of the base strips includes an upper portion located above the closure profiles. These upper portions of the base strips may be configured for easy opening of the recloseable bag, and may include ridges for increasing friction with a person's fingertips to facilitate opening of the bag.

In certain implementations, the heat required to bond the profile to the film may be reduced by about 25° C. over other prior art zipper configurations. The temperature to melt specific sealants may, for example, be reduced from 112° C. to 86° C.

The zipper of the invention may further include a peelable seal joining the first and second base strips at a position above the closure profiles. The peelable seal may be formed of a mixture of low density polyethylene, ethylene vinyl acetate and a third polymeric compound, such as polypropylene.

In certain implementations of the present invention, the upper portion of the zipper profile may be configured to include a hermetic seal. The hermetic seal may join the first and second base strips at a position above the closure profiles, and may be formed by heat-sealing the first base strip to the second base strip. A perforation may be placed in the first and second base strips at a position between the hermetic seal and the closure arrangement. The perforation may permit the removal of a top portion of the zipper to gain access to the closure profile and the interior of the bag. In other embodiments, the zipper may include a tear bead for removing the hermetic seal. In addition, the zipper may include a hole in the base portion for hanging the bag on a display hook. A header portion above the closure arrangement may be formed for displaying information.

The above summary of the present invention is not intended to describe each illustrated embodiment, or every implementation of the present invention. This is the purpose of the figures and the detailed description which follow.

BRIEF DESCRIPTION OF THE DRAWINGS

Other aspects and advantages of the invention will become apparent upon reading the following detailed description and upon reference to the drawings in which:

FIGS. 5a, 5b, and 5c are cross-sectional views of the closure arrangement in FIG. 1, showing alternate locations for applying the heat-setting sealant compound;

FIG. 6 is a cross-sectional view of a closure arrangement, showing multi-track closure profiles;

Figure 1:
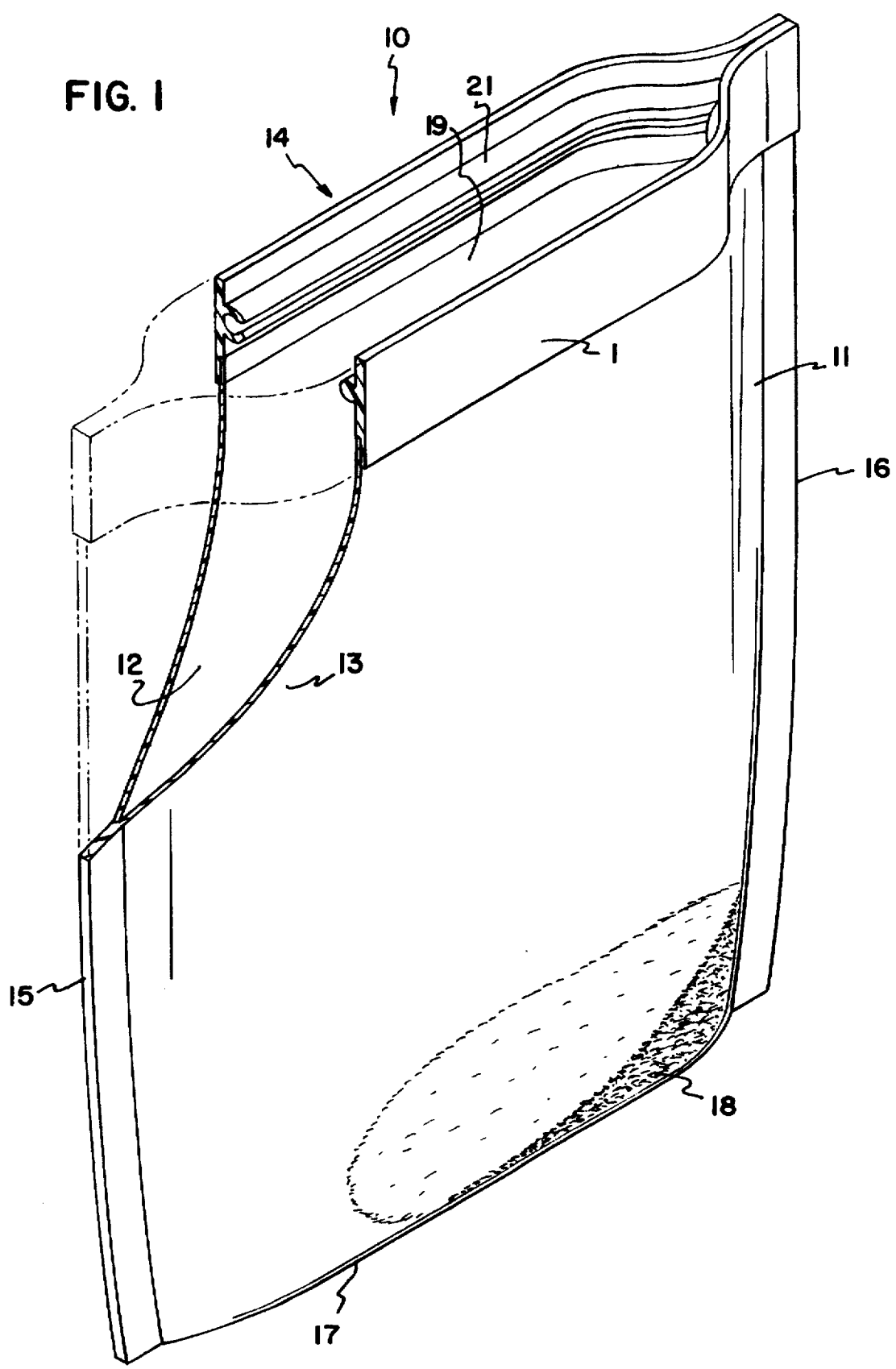
FIG. 1 is a perspective view of a zipper closeable bag arranged and constructed with a closure arrangement in accordance with the present invention.

While the invention is susceptible to various modifications and alternative forms, specifics thereof have been shown by way of example in the drawings and will be described in detail. It should be understood, however, that the intention is not to limit the invention to the particular embodiments described. On the contrary, the intention is to cover modifications, equivalents, and alternatives falling within the spirit and scope of the invention as defined by the appended claims.

DESCRIPTION OF THE ILLUSTRATED EMBODIMENTS

A recloseable flexible bag, constructed in accordance with the present invention is shown in FIG. 1 generally as 10. Flexible bag 10 is made of first and second opposed panel sections 12, 13 of a polymeric film. First and second panel sections 12, 13 are shown being rectangular in shape and are heat sealed together along at least two edges in order to form a product containment section within the interior of bag 10. Flexible bag 10 includes a pair of side edges 15, 16 and a bottom edge 17. Access to the interior of the bag is provided through an opening 14. Further, the bag need not be rectangular, but can be other shapes and sizes.

The panel sections 12, 13 define an enclosed portion 19. This enclosed portion may be used to hold a product 18. Product 18 may be a variety of edible food substances such as cheese, meat, crackers, etc. Non-edible products may be enclosed as well.

As illustrated in FIGS. 2 through 5, flexible bag 10 includes a zipper 21 extending from side edge 15 to side edge 16. In the particular embodiment illustrated, zipper 21 includes a first base strip 20 and a second base strip 30. The zipper 21 includes an elongated female profile 22 and an elongated male profile 32. Female profile 22 is attached to or integrally formed with first base strip 20, and male profile 32 is attached to or integrally formed with second base strip 30. Female and male profiles 22 and 32 cooperate by interlocking to allow bag 10 to be opened and re-closed at opening 14.

Figure 2:
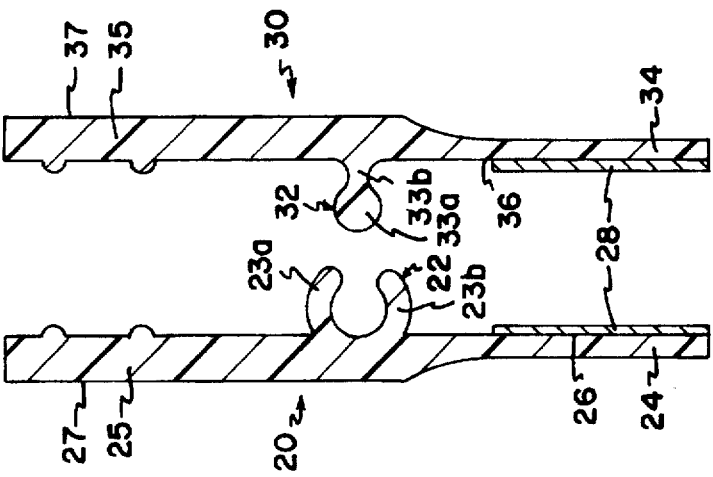
FIG. 2 is a cross-sectional view of the closure arrangement in FIG. 1.

As illustrated in FIG. 2, male profile 32 has a cross section which is generally T-shaped including an expanded head portion 33a and a narrower trunk portion 33b. Female profile 22 includes a locking structure for enclosing and interlocking with male profile 32. The locking structure of female profile 22 includes first and second legs 23a and 23b. First and second legs 23a, 23b have a rounded cross section which mechanically engage head 33a of male profile 32 to re-close bag 10. First and second legs 23a, 23b of the female profile 22 are attached to or integrally formed with first base strip 20.

The zipper 21 includes flange portions 24, 34 located below the female profile 22 and male profile 32. The inner surfaces 26, 36 of the flange portions 24, 34 are configured for attachment to the panels 12, 13 of the polymeric bag 10. A heat-setting adhesive 28 is coextruded, coated or laminated to the inner surfaces 26, 36 of the flanges 24, 34 during extrusion. The zipper 21 is permanently attached to polymeric bag 10 by adhering flanges 24, 34 to panel sections 12, 13 via the heat-setting adhesive. To attach the zipper 21 to the bag 10, a heated metal bar (not shown) is brought in contact with the outer surfaces of the flanges 24, 34 to provide sufficient heat to fuse the inner surfaces 26, 36 of the flanges 24, 34 to the polymeric film 11.

The heat-setting adhesive may be one of numerous compounds known to those of skill in the art. Examples of heat-setting compounds which may be used in the practice of this invention include anhydride modified polyolefins, metallocene catalyzed low density polyethylene, maleic anhydride, anhydride modified ethylene vinyl acetate, polypropylene copolymers, polypropylene copolymers blended with ethylene vinyl acetate, polypropylene copolymers and polyolefin blends, polypropylene terpolymers, polypropylene terpolymers and polyolefin blends, polypropylene terpolymers and ethylene vinyl acetate blends, polypropylene based thermoplastic polyolefins, butene polypropylene copolymers and polypropylene-based flexible polyolefins, EVA, EMA, EMMA, EAA, EMAA, or EEA. In certain implementations, the compound will have strong bonding properties with both the film material and the zipper material. In certain implementations, the adhesive will have a melting temperature well below that of common zipper material, 25° C. and or more, and a tensile strength when adhering a zipper 21 to a film 11 that exceeds the opening force of the profile to maintain permanent adhesion.

The use-of these heat-setting adhesives is advantageous because they have a fusing temperature below that of common zipper materials, such as low density polyethylene, linear low density polyethylene, or a low density polyethylene blend. This lower temperature permits quicker adhesion of the zipper to the bag because the heating bar does not need to be in contact with the zipper 21 for as long as would be necessary without the heat-setting adhesive. In addition, the layers of polymeric film 11 forming the bag walls are less likely to fuse to one another if less heat is required. Although the use of the heat-setting adhesive permits a decrease in the temperature required to fuse the zipper 21 to the film 11, a strong bond is still created. In addition, the use of the heat-setting co-extruded adhesive permits the use of conventional equipment to fuse the zipper 21 to the film 11, as opposed to specialized equipment which would be necessary with some other adhesives such as a rolled or sprayed adhesive applied after extrusion of the zipper 21.

Figure 4:
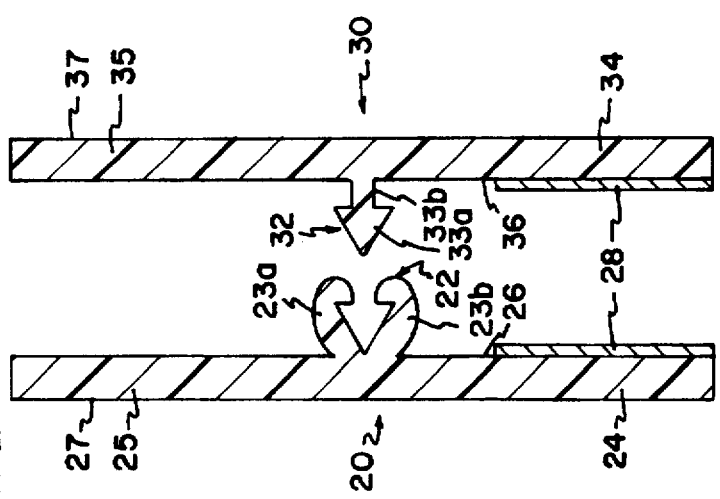
FIG. 4 is a cross-sectional view of the closure arrangement in FIG. 1, showing the male and female profiles separated from one another.

As shown in FIG. 4, the flanges 24, 34 are constructed so that they are thinner than the upper portions 25, 35 of the base strips 20, 30. The thinner flanges 24, 34 allow the zipper to be thermally fused to the bag with less heat than would be required if the flanges 24, 34 were the same thickness as the upper portions 25, 35. Therefore, a heated metal bar with a relatively low temperature is used to fuse the inner surfaces 26, 36 of the flanges 24, 34. Alternatively, the heated metal bar is pressed against the flanges 24, 34 for a shorter period of time than required by thicker flanges, given a constant temperature and pressure. As another alternative, the metal bar may be heated to a lower temperature and the metal bar may be brought in contact with the flanges 24, 34. In one implementation, the flanges 24, 34 are from 2 to 4 mils thick; and the upper portions 25, 35 are from 4 to 7 mils thick. In another implementation, the flanges 24, 34 are from 2 to 3 mils thick; and the upper portions 25, 35 are from 5 to 6 mils thick. This will vary from application to application.

The reduced heat necessary to fuse the flanges 24, 34 to the panels 12, 13 is highly advantageous because it can help prevent the fusion of the inner surfaces of the panels 12, 13 to one another. With prior art zippers, the thick base strips create a barrier to thermal transfer and necessitate higher temperatures in order to effectuate thermal fusion of the panels with the zipper. The thick base strips thermally insulate to inhibit fusion, and act as a heat reservoir to heat the bag panels after the panels are fused to the zipper. This can cause puckering, wrinkling, and film distortion.

The use of thin flange portions 24, 34 of the base strips 25, 35 along with a thicker upper portion of the base strips 25, 35 is advantageous. The upper portions provide adequate strength for opening, and provide a stable anchor for the closure profiles. In addition, the thin flange portions 24, 34 result in less material being used in their manufacture, resulting in savings in production costs.

As shown in FIGS. 2 and 5, the heat-setting compound 28 may be distributed along the inner surface 26, 36 of the flanges 24, 34 in configurations. In one implementation, shown generally in FIG. 2, the heat-setting adhesive 28 may be distributed in a uniform-width band along the inner surfaces 26, 36 of each of the flanges 24, 34. In certain implementations, the dimension for this uniform-width band is approximately 0.5 to 1 mils thick and 4 to 7 mm wide. The heat-setting adhesive 28, 38 may be distributed along the entire length of the zipper 21 from the first side edge 15 to the second side edge 16. The heat-setting compound 28 may also be distributed in thin bands 45, as shown in FIG. 5a. In another implementation, the heat-setting adhesive 28 is distributed on each of the flanges 24, 34 to leave a gap between the heat-setting compound 28 and the profiles 22, 32, as shown in FIG. 5b. Alternatively, the heat-setting compound 28 may be distributed in two bands 47 along the inner surfaces 26, 36 of each of the flanges 24, 34, as shown in FIG. 5c.

Figure 3:
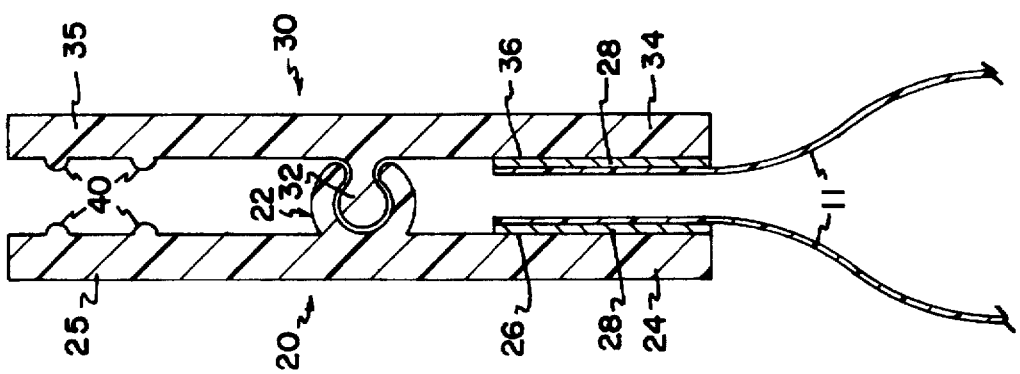
FIG. 3 is a cross-sectional view of the closure arrangement in FIG. 1, showing the male and female closure profiles in an interlocking position.

FIGS. 3 and 4 illustrate that the upper portions 25, 35 of the first profile 20 and second profile 30 may include ridges 40. These ridges provide a protrusion which enhances gripping of the zipper and permits easier opening of the bag 20.

In yet a further embodiment of the present invention, a multi-track or compound zipper is used. In this embodiment, base portions 50 and 51 include male and female closure profiles, or other elements in addition to only male and female profiles. In a compound zipper, base portions 50 and 51 each include both male and female portions. The disclosure in U.S. Pat. No. 5,403,094 to M. Tomic is incorporated by reference to indicate possible multi-track or compound closure configurations.

Figure 8:
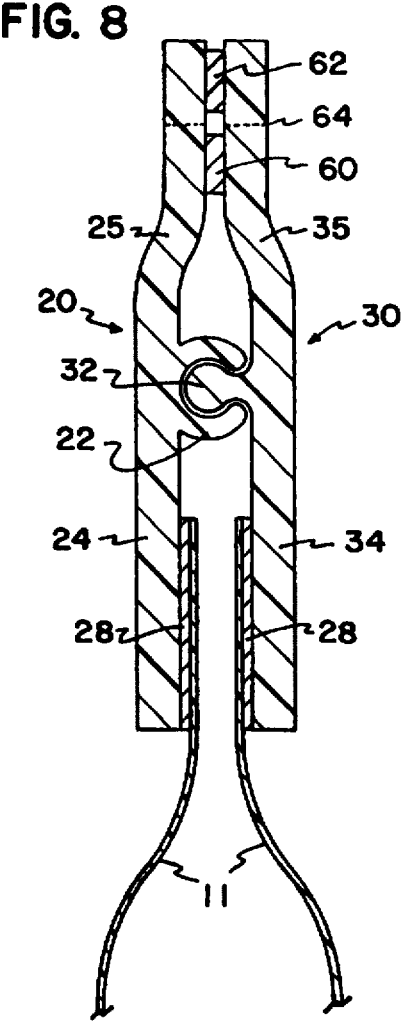
FIG. 8 is a cross-sectional view of the closure arrangement in FIG. 1 showing a permanent seal and a peel seal between the base portions.

As shown in FIG. 8, including a peelable seal 60 joining the first and second base strips 20, 30 is advantageous in certain applications. The peelable seal 60 provides an airtight seal above the top of the closure profiles 22, 32. The peelable seal 60 remains intact until the recloseable bag is first opened, after which the peelable seal is broken and not typically resealable. The peelable seal 60 can provide a way of keeping the contents of the recloseable bag fresh, as well as indicating whether the bag has previously been opened and the contents removed or tampered with.

The peelable seal 60 is typically formed by coextruding a polymeric material to the inner surface of the upper portion of the base strips 20, 30. The polymeric material, coextruded with the base strips 20, 30, is typically a mixture of resins, some of which are used to enhance bonding, while others to prevent bonding. The compound or mixture of compounds used to form the peelable seal 60 is selected to create an adequate seal between the base strips 20, 30, but the seal should not be so strong that the zipper 21 is destroyed during opening. Typically, the compound forming the peelable seal has a similar melting point to that of the base strip 20, 30.

Figure 7:
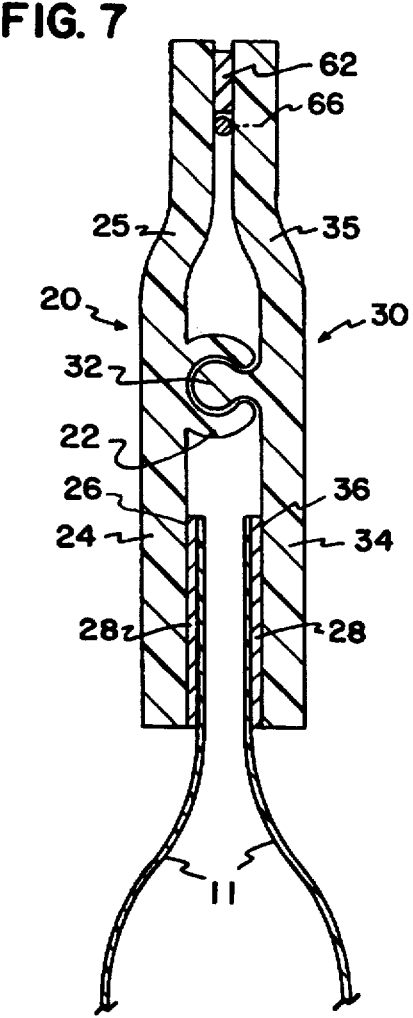
FIG. 7 is a cross-sectional view of the closure arrangement in FIG. 1, showing a permanent seal between the base portions.

In another implementation of the present invention, shown in FIGS. 7 and 8, a hermetic seal is formed between the first and second base strips 20, 30. The hermetic seal 62 provides a sterile closure to the polymeric bag 10, and can be used in numerous applications where the contents of the bag 10 are kept free from contamination, such as bags storing food products for retail sale. The hermetic seal 62 may be formed by thermally fusing the upper portions of the base strips. The upper portions of the base strips 20, 30 are extended in order to provide sufficient space for the hermetic seal. A perforation 64 or tear bead 66 may be located between the hermetic seal and the closure profiles 22, 24, to facilitate easy opening of the bag. A peelable seal 60 may be added between the perforations 64 and the closure profiles 22, 32 to help maintain a hermetic seal.

Figure 9:
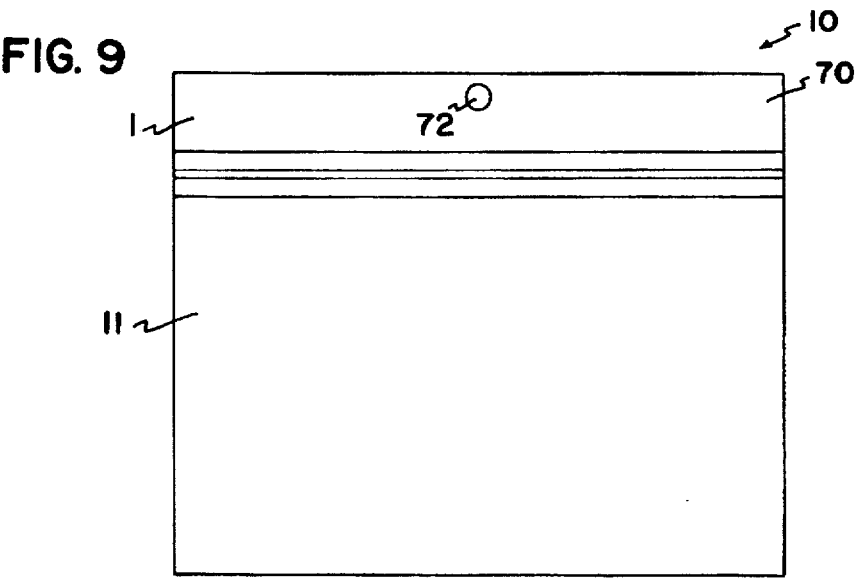
FIG. 9 is a frontal view of a zipper closeable bag arranged and constructed in accordance with the present invention.

As shown in FIG. 9, in certain implementations, the upper portion of the base strips may include a header 70 for printing information or a hole 72 for hanging the bag in a display. The disclosure in U.S. Pat. No. 5,480,230 to T. May is incorporated herein by reference.

Various modifications and variations can be made to embodiments illustrated herein without departing from the scope or spirit of the invention. For example, a zipper having a peelable seal that provides a tamper indication can also be used with the embodiments illustrated herein. One example of a peelable seal can be found in U.S. Pat. No. 5,470,156, hereby incorporated by reference. Further, tear strings and notches may also be used with the embodiments illustrated herein.

It is intended that the specification and examples be considered as exemplary only, with the true scope and spirit of the invention being indicated by the following claims.

I claim:

1. A zipper for a recloseable bag of a polymeric film having an interior and an exterior surface, the zipper comprising:

first and second generally parallel extruded base strips, a first closure profile on the inner surface of the first base strip and a second closure profile on the inner surface of the second base strip, the closure profiles positioned above the flange portions and configured to interlock with one another above the bag films; and a heat-setting sealant compound coextruded, coated or laminated to the inner surface of the flange portions for permanently adhering the inner surfaces of the flange portions to the exterior surfaces of the film below the first and second closure profiles, wherein the thickness of the flange portions is less than the thickness of the base strips above the flange portions.

2. The zipper of claim 1, wherein the flange portions are from two to three mils thick.

3. The zipper of claim 1, wherein the portion of the base strips above the closure profiles is from five to six mils thick.

4. The zipper of claim 1, wherein the heat-setting compound is an adhesive selected from the group consisting of anhydride modified polyolefins, metallocene catalyzed low density polyethylene, maleic anhydride, anhydride modified ethylene vinyl acetate, polypropylene copolymers, polypropylene copolymers blended with ethylene vinyl acetate, polypropylene copolymers and polyolefin blends, polypropylene terpolymers, polypropylene terpolymers and polyolefin blends, polypropylene terpolymers and ethylene vinyl acetate blends, polypropylene based thermoplastic polyolefins, butene polypropylene copolymers, EVA, EMA, EMMA, EAA, EMMAA, EEA, acid modified EVA, and polypropylene-based flexible polyolefins.

5. The zipper of claim 1, wherein the heat-setting compound is distributed in a uniform width band along the inner surface of each of the flanges.

6. The zipper of claim 1, wherein the heat-setting compound is distributed in at least two bands along the inner surface of each of the flanges.

7. The zipper of claim 1, wherein the heat-setting compound is distributed on each of the flanges so as to leave a gap between the heat-setting compound and the closure profile.

8. The zipper of claim 1, wherein each of the first and second base strips further comprises an upper portion.

9. The zipper of claim 8, wherein the upper portions of the first and second base strips include ridge structures providing a surface for increasing the grip between a hand and the zipper.

10. The zipper of claim 9, wherein the ridge structures are on the inside surface of the first and second base strips.

11. The zipper of claim 1, wherein the heat-setting sealant compound has a temperature threshold magnitude which is activated and wherein the base strip is bonded to the film by applying heat to the outer surface of the flange portion of the base strip, the heat having a magnitude whereby the amount of heat is selected as a function of the thickness of the flange portion of the base strip.

12. The zipper of claim 1, further comprising a header portion above the closure arrangement for displaying information.

13. The zipper of claim 1, wherein the zipper defines a hole for hanging the bag.

14. A zipper for a recloseable bag of a polymeric film having an interior and an exterior surface, the zipper comprising:

first and second generally parallel extruded base strips, the base strips laterally spaced from each other, each of the base strips having an inner surface, an outer surface, and a flange portion;

a first closure profile on the inner surface of the first base strip and a second closure profile on the inner surface of the second base strip, the closure profiles positioned above the flange portions and configured to interlock with one another above the bag films;

a heat-setting sealant compound coextruded, coated or laminated to the inner surface of the flange portions for permanently adhering the inner surfaces of the flange portions to the exterior surfaces of the film below the first and second closure profiles, and a peelable seal joining the first and second base strips at a position above the first and second closure profiles.

15. The zipper of claim 14, wherein the peelable seal includes a mixture of low density polyethylene, ethylene vinyl acetate and a third polymeric material.

16. The zipper of claim 14, wherein the peelable seal includes a mixture of low density polyethylene, ethylene vinyl acetate and polypropylene.

17. A zipper for a recloseable bag of a polymeric film having an interior and an exterior surface, the zipper comprising:

first and second generally parallel extruded base strips, the base strips laterally spaced from each other, each of the base strips having an inner surface, an outer surface, and a flange portion;

a first closure profile on the inner surface of the first base strip and a second closure profile on the inner surface of the second base strip, the closure profiles positioned above the flange portions and configured to interlock with one another above the bag films;

a heat-setting sealant compound coextruded, coated or laminated to the inner surface, of the flange portions for permanently adhering the inner surfaces of the flange portions to the exterior surfaces of the film below the first and second closure profiles, and a hermetic seal joining the first and second base strips at a position above the first and second closure profiles.

18. The zipper of claim 17, wherein the hermetic seal joining the first and second base strips is formed by thermally fusing the first base strip to the second base strip.

19. The zipper of claim 17 further comprising a perforation in the first and second base strips at a position between the hermetic seal and the closure arrangement, the perforation permitting the removal of a top portion of the zipper to gain access to the closure profile and interior of the bag.

20. The zipper of claim 17, further comprising a tear bead attached to the zipper for removing the hermetic seal.

21. A zipper for attachment to a polymeric bag, the zipper comprising:

first and second generally parallel extruded base strips, the base strips laterally spaced from each other; each of the base strips having an inner surface, an outer surface, a flange portion, and a first portion above the flange portion;

the thickness of the flange portions being less than the thickness of the respective first portions;

a first closure profile on the inner surface of the first base strip and a second closure profile on the inner surface of the second base strip, the closure profiles each positioned on one of the first portions and the closure profiles configured to interlock with one another above the bag films; and a heat-setting sealant compound coextruded, coated or laminated to the inner surface of the flange portions for permanently adhering the inner surfaces of the flange portions to exterior surfaces of the polymeric bag at a point below the first and second closure profiles, heat sealable at a temperature below the melting point of the polymeric bag, and for providing a seal between the exterior surfaces of the polymeric bag and the flange portions.

22. The zipper of claim 21, further comprising a hermetic seal joining the first and second base strips at a position above the first and second closure profiles.

23. The zipper of claim 21, further comprising a peelable seal joining the first and second base strips at a position above the first and second closure profiles.

24. The zipper of claim 21, wherein each of the base strips further comprises an upper portion configured with ridge structures providing a surface for increasing the grip between a hand and the zipper.

25. A zipper for a recloseable bag of polymeric film having an interior and an exterior surface, the zipper comprising:

first and second generally parallel extruded base strips comprising low density polyethylene or ethylene vinyl acetate, the base strips laterally spaced from each other, the base strips each having an inner surface, an outer surface, a flange portion, and a first portion;

a closure profile on the inner surface of each of the base strips, the closure profiles positioned above the flange portions;

the flange portions having a thickness of from two to four mils, and the first portions having a thickness of from four to seven mils, the thickness of each of the flange portions being less than the thickness of the respective first portions; and a heat-setting sealant compound, the heat-setting sealant compound coextruded, coated or laminated to the inner surface of the flange portion for permanently adhering the inner surface of the flange portion to the exterior surface of the polymeric film.

26. A recloseable thermoplastic bag comprising:

a zipper including first and second generally parallel extruded base strips, each of the first and second base strips including a flange portion;

a first closure profile on an inner surface of the first base strip and a second closure profile on an inner surface of the second base strip, the closure profiles positioned above the flange portions and configured to interlock with one another;

a polymeric film having an interior and an exterior surface; and a heat-setting sealant compound coextruded, coated or laminated to the inner surface of the flange portions for permanently adhering the inner surfaces of the flange portions to the exterior surface of the film below the first and second closure profiles, 'wherein the thickness of the flange portions is less than the thickness of the base strips above the flange portions.

27. The bag of claim 26, wherein the thickness of the flange portions is 2 to 4 mils less than the thickness of the base strips above the flange portions.

28. The bag of claim 26, wherein the heat-setting compound is an adhesive selected from the group consisting of:

anhydride modified polyolefins, metallocene catalyzed low density polyethylene, maleic anhydride, anhydride modified ethylene vinyl acetate, polypropylene copolymers, polypropylene copolymers blended with ethylene vinyl acetate, polypropylene copolymers and polyolefin blends, polypropylene terpolymers, polypropylene terpolymers and polyolefin blends, polypropylene terpolymers and ethylene vinyl acetate blends, polypropylene based thermoplastic polyolefins, butene polypropylene copolymers, EVA, EMA, EMMA, EAA, EMAA, EEA, acid modified EVA, and polypropylene-based flexible polyolefins.

* * * * *